US00RE43456E

(19) United States
(12) Reissued Patent
Verfuerth et al.

(10) Patent Number: US RE43,456 E
(45) Date of Reissued Patent: Jun. 12, 2012

(54) FLUORESCENT TUBE LIGHT LOW BAY REFLECTOR

(75) Inventors: Neal R. Verfuerth, Manitowoc, WI (US); Donald C. Heimerman, Random Lake, WI (US); Kenneth J. Wetenkamp, Plymouth, WI (US); Ronald E. Ernst, Waldo, WI (US)

(73) Assignee: Orion Energy Systems, Inc., Plymouth, WI (US)

(21) Appl. No.: 29/333,666

(22) Filed: Mar. 12, 2009

Related U.S. Patent Documents

Reissue of:
(64) Patent No.: Des. 538,462
Issued: Mar. 13, 2007
Appl. No.: 29/203,684
Filed: Apr. 19, 2004

(51) LOC (9) Cl. ..... 26-99
(52) U.S. Cl. ..... D26/118
(58) Field of Classification Search ..... D26/24, D26/72, 75, 76, 85, 87, 88, 92, 93, 113, 118, D26/119, 120, 122, 138, 140, 141, 142, 145, D26/152, 155; 52/695, 696; D8/354, 356, D8/373, 349, 380; 362/335, 341, 342, 325, 362/326, 330, 301, 317, 323, 290, 291, 296, 362/279, 280, 285, 260, 270, 277, 145, 147, 362/151, 152, 217, 257
See application file for complete search history.

(56) References Cited

U.S. PATENT DOCUMENTS 1,888,103 A * 11/1932 Guth ..... 362/348
2,219,383 A 10/1940 Dillon
D130,744 S * 12/1941 Krasemann, Sr. ..... D8/380
2,565,875 A * 8/1951 Musacchia ..... 52/695
D177,532 S * 4/1956 Meyer et al. ..... D26/128
2,741,694 A * 4/1956 Wiig et al. ..... 362/340
D180,611 S 7/1957 McPhail
D193,802 S * 10/1962 Thomsen et al. ..... D26/128
3,125,301 A * 3/1964 Stotter ..... 362/217.06
D207,596 S * 5/1967 Wince ..... D26/122
3,477,187 A * 11/1969 Fruman ..... 52/346
D243,246 S * 2/1977 England ..... D13/102
(Continued)

*Primary Examiner* — Philip S Hyder
*Assistant Examiner* — Kevin Rudzinski
(74) *Attorney, Agent, or Firm* — Foley & Lardner LLP

(57) CLAIM

We claim the ornamental design for fluorescent tube light low bay reflector, as shown and described.

DESCRIPTION

Figure 5:
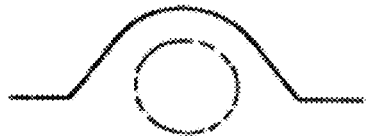
Figure 4:
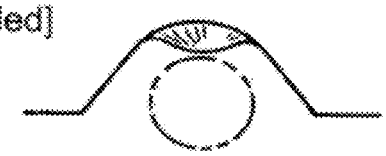
Figure 3:
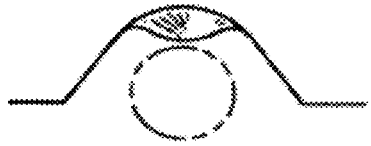
Figure 2:
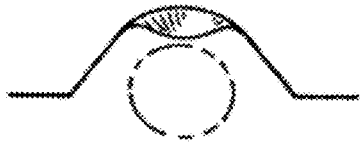
Figure 9:
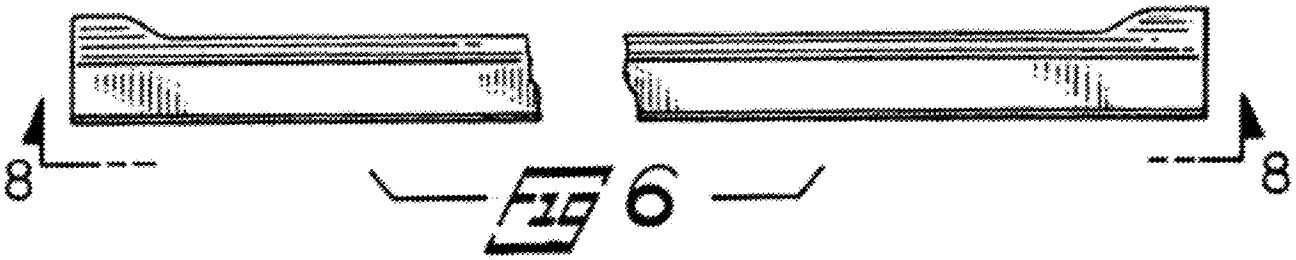

FIG. 1 is a top plan view of the fluorescent tube light low bay reflector, showing our new design;
FIG. 2 is a cross sectional view thereof, taken along line 2—2 of FIG. 1;
FIG. 3 is a cross sectional view thereof, taken along line 3—3 of FIG. 1;
FIG. 4 is a cross sectional view thereof, taken along line 4—4 of FIG. 1;
FIG. 5 is a cross sectional view thereof, taken along line 5—5 of FIG. 1;
FIG. 6—is a left side elevation view, and the right side elevation view is a mirror image of the left side elevation view;
FIG. 7—is a perspective top view; and,
FIG. 8 is a bottom plan view of the fluorescent tube light low bay reflector.
[The broken lines shown in FIGS. 1, 2, 3, 4, 5, 7 and 8 are for illustration only, and form no part of this invention.] *The evenly spaced broken lines in FIGS. 1, 7 and 8 depict an unclaimed portion of the article. The unevenly spaced broken lines in FIGS. 2 through 5 depict an environmental structure that forms no part of the claimed design.*

1 Claim, 3 Drawing Sheets

Matter enclosed in heavy brackets [ ] appears in the original patent but forms no part of this reissue; matter printed in italics indicates the additions made by reissue.

U.S. PATENT DOCUMENTS

D254,476 S * 3/1980 Gilb ..... D8/354
4,246,736 A * 1/1981 Kovar et al. ..... 52/696
4,363,082 A 12/1982 Roland
D272,886 S * 3/1984 Holcombe ..... D8/380
D275,450 S * 9/1984 Wegener, II ..... D8/373
4,499,529 A 2/1985 Figueroa
4,514,793 A * 4/1985 Andreasen ..... 362/306
4,669,033 A 5/1987 Lee
4,674,016 A 6/1987 Gallagher
D292,619 S * 11/1987 Chen ..... D26/141
4,719,546 A 1/1988 Spitz
4,814,954 A * 3/1989 Spitz ..... 362/217.07
4,843,521 A * 6/1989 Plofchan ..... 362/16
4,933,823 A 6/1990 Taylor
D311,596 S * 10/1990 Herst et al. ..... D26/85
D314,637 S 2/1991 Holcomb
5,253,151 A * 10/1993 Mepham et al. ..... 362/216
D348,746 S * 7/1994 Herst et al. ..... D26/85
D349,358 S * 8/1994 Herst et al. ..... D26/85
D359,225 S * 6/1995 Reed ..... D8/354
D364,478 S * 11/1995 Pesau ..... D26/76
5,530,255 A * 6/1996 Lyons et al. ..... 250/492.3
D374,301 S * 10/1996 Kleffman ..... D26/76
D379,295 S * 5/1997 Kopish ..... D8/349
D398,835 S * 9/1998 Coll et al. ..... D8/354
D399,587 S * 10/1998 Compton et al. ..... D26/76
5,988,829 A 11/1999 Holder
D426,338 S 6/2000 Herst et al.
6,257,735 B1 7/2001 Baar
6,354,055 B1 * 3/2002 Shaw et al. ..... 52/712
6,578,983 B2 6/2003 Holten
6,585,396 B1 7/2003 Verfuerth
D486,263 S * 2/2004 Grothe et al. ..... D26/118
6,746,274 B1 6/2004 Verfuerth
6,758,580 B1 7/2004 Verfuerth
7,018,074 B2 * 3/2006 Raby et al. ..... 362/306
D544,138 S 6/2007 Hargreaves
7,261,435 B2 8/2007 Gould et al.
D575,139 S * 8/2008 LePoire et al. ..... D8/349
D595,894 S * 7/2009 Verfuerth et al. ..... D26/122
2003/0072152 A1 4/2003 Southern, Jr.
2004/0136187 A1 7/2004 Plunk et al.

* cited by examiner

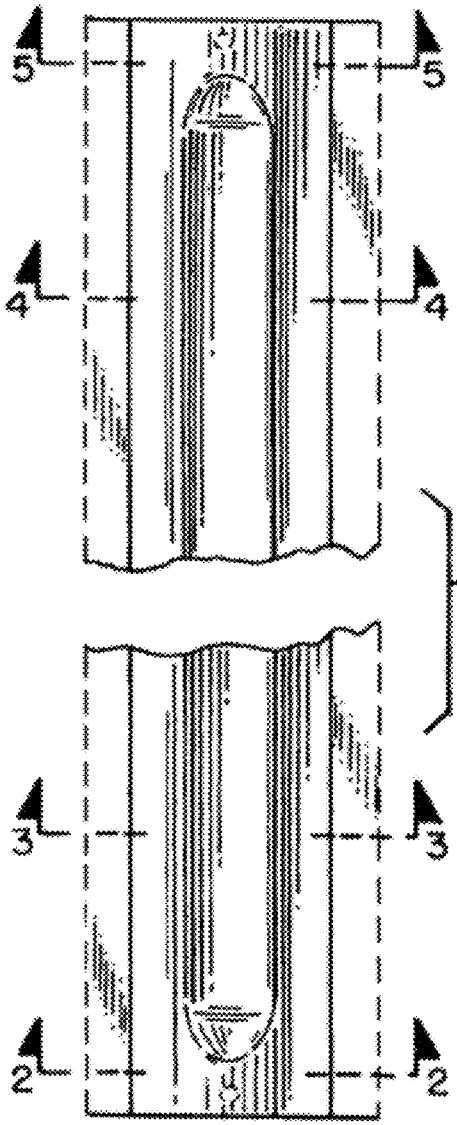
Fig 1
[Amended]

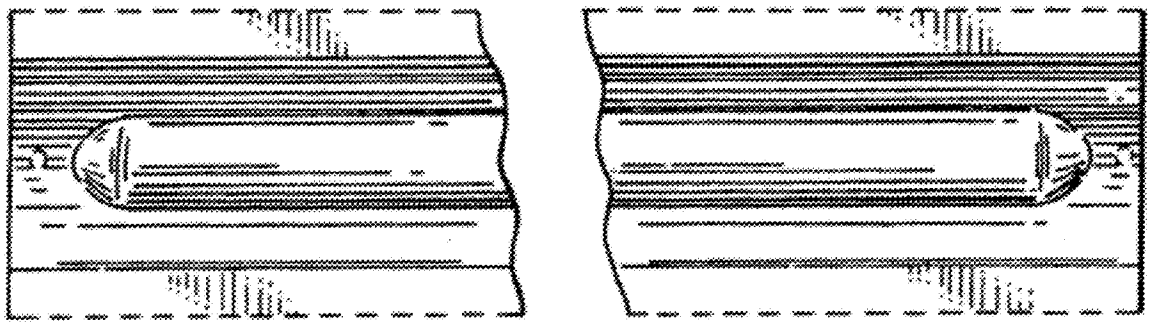
FIG. 8
[Amended]

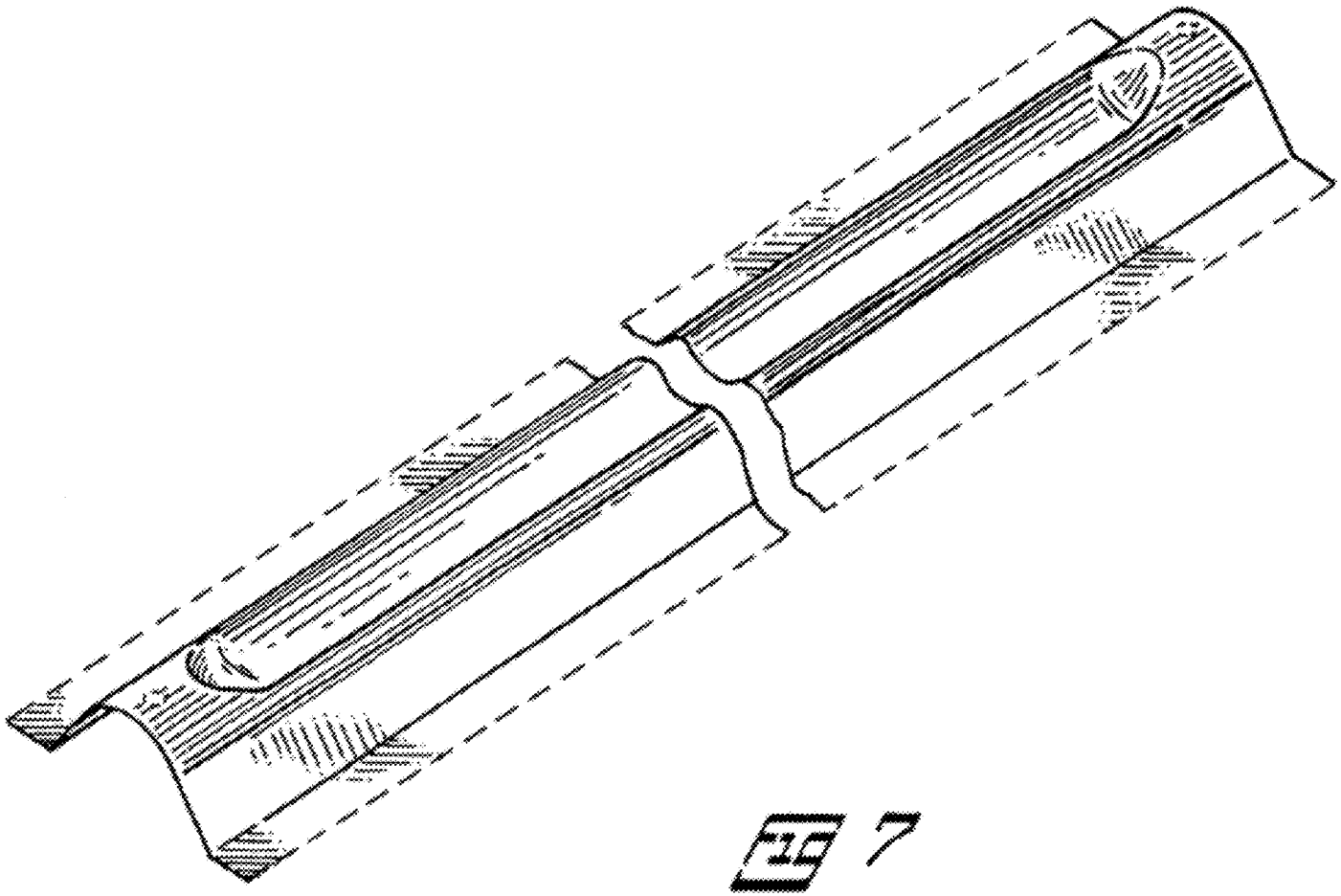
FIG 7 [Amended]